United States Patent [19]
Webb et al.

[11] Patent Number: 5,675,871
[45] Date of Patent: Oct. 14, 1997

[54] HOSE CLAMP LOCATION DEVICE

[75] Inventors: Scott D. Webb, Murfreesboro; Kevin M. Cradduck, Christiana; Craig A. Senovich, Murfreesboro, all of Tenn.

[73] Assignee: ACD Tridon Inc., Burlington, Canada

[21] Appl. No.: 731,152

[22] Filed: Oct. 10, 1996

[51] Int. Cl.$^6$ .................................................. F16L 33/02
[52] U.S. Cl. .................. 24/20 R; 24/205; 285/23; 285/337; 285/365
[58] Field of Search .............................. 285/23, 337, 365; 24/20 R, 274 R, 20 TT, 20 CW, 20 S, 456, 20 EE

[56] References Cited

U.S. PATENT DOCUMENTS

| | | |
|---|---|---|
| 3,365,218 | 1/1968 | Denyes . |
| 3,407,449 | 10/1968 | Tetzlaff et al. . |
| 4,882,814 | 11/1989 | Takahashi . |
| 5,145,218 | 9/1992 | Worley et al. . |
| 5,185,913 | 2/1993 | Campo et al. . |
| 5,234,233 | 8/1993 | Fix . |
| 5,309,607 | 5/1994 | Hohmann et al. . |
| 5,405,170 | 4/1995 | Roulinson et al. ................. 24/20 S X |

FOREIGN PATENT DOCUMENTS

| | | |
|---|---|---|
| 8805587 | 4/1988 | France . |
| 3543717 | 6/1987 | Germany . |

*Primary Examiner*—James R. Brittain
*Attorney, Agent, or Firm*—Bacon & Thomas

[57] ABSTRACT

The invention provides a locating device for locating and holding a prestressed hose clamp on a cylindrical hose having a selected radius of curvature. The device has a resilient C-shaped clamp engaging element having opposed free ends defining a gap, the element being generally cylindrical about a first axis and the gap being smaller than an internal diameter of the element so that the clamp can be pushed through the gap and gripped by the element with radial projections on the clamp extending through the gap. A pair of resilient hose engaging elements are attached to the clamp engaging element and spaced axially spaced with the clamp engaging element between the hose engaging elements which are proportioned to apply a load on the hose contained in the device to bias the hose away from the gap and into contact with the clamp at a location diametrically opposite the radial projections.

14 Claims, 1 Drawing Sheet

5,675,871

HOSE CLAMP LOCATION DEVICE

FIELD OF THE INVENTION

This invention relates to securing deformable hoses on rigid cylindrical fittings such as those found in automobile engines. More particularly the invention relates to a hose clamp locating device to locate and orientate a clamp on a hose ready to release the clamp to apply a radial compressive force on the hose.

BACKGROUND OF THE INVENTION

Hose clamps have been designed in a great variety of forms which fall into three general types. A first of these types is a continuous band which includes an upstanding portion or "ear "which can be deformed after assembly to tension the band around a hose. Such clamps are sometimes referred to as "Oetiker "clamps after the inventor. The clamps are engaged on a hose by using a special tool to deform the ear and thereby tension the band to apply a compressive radial stress on the hose.

A second type of clamp includes a mechanical actuator, such as a worm screw, acting directly on a band to bring the band into firm engagement with the hose. Lastly, the third type is a clamp of spring steel made to have a diameter slightly less than that of the outside diameter of the hose, so that when the clamp is deformed to enlarge the clamp, there will be stored energy in the clamp which and be released to apply a compressive radial force to hold the clamp on the hose.

It has become common practice in automobile applications to use parts which minimize the work done on the assembly line. For this reason the prestressed spring steel clamp has been developed in a variety of forms. One of these forms which has found considerable acceptance consists of a clamp which is enlarged at the point of manufacture and retained in this condition either by build-in structure or by a keeper in the form of a clip. Typically, the clamp is then placed on a hose and glued in position at a point diametrically opposite the restraining structure or clip so that on the automobile assembly line the hose can be put in place and the clamp engaged simply by releasing it.

The use of an adhesive to hold the open clamp in position on the hose presents a number of difficulties. Firstly adhesive tends to be undesirable simply because of the inherent problems of handling and applying the adhesive. Also, and possibly more importantly, the adhesive joints can fail in transit to the assembly plant.

For these reasons it is desirable to provide an alternative approach to locating clamps on hoses to ensure that the assembly is intact when it is delivered to the assembly plant.

One approach to providing location for a prestressed clamp on a hose is found in U.S. Pat. No. 4,882,814. This patent teaches the use of a retaining plate engaged inside the clamp to urge the clamp into engagement with the hose at a point diametrically opposite a retaining clip. Such a structure will result in an uneven distribution of radial stress when deployed on the hose due to the discontinuities where the ends of the retaining plate are located. These discontinuities are not normally acceptable in pressurized systems such as those used in automobiles.

The same patent teaches another approach. A clip used to retain the clamp in a stressed condition is extended beyond the sides of the clamp to bear down on the hose thereby aligning and locating the clamp. This structure also presents difficulties because the reactive load on the clip will tend to strip it prematurely.

U.S. Pat. No. 5,234,233 teaches another approach to providing a clamp and hose assembly. This patent demonstrates a series of rubber bands which, when applied around a clamp, tend to locate and orientate the clamp on a hose. These bands must be attached to the hose clamp, probably after the clamp has been placed on the hose. The structures taught in the patent would require considerable dexterity to assemble and are therefore not desirable structures.

Accordingly, it is an object of the present invention to provide an improved device which can be used to locate a prestressed hose clamp on a hose and more particularly to locate a prestressed hose clamp on a hose.

SUMMARY OF THE INVENTION

The invention provides a locating device for locating and holding a hose clamp on a cylindrical hose having a selected radius of curvature. The device has a resilient C-shaped clamp engaging element having opposed free ends defining a gap, the element being generally cylindrical about a first axis and the gap being smaller than an internal diameter of the element so that the clamp can be pushed through the gap and gripped by the element with radial projections on the clamp extending through the gap. A pair of resilient hose engaging elements are attached to the clamp engaging element and spaced axially with the clamp engaging element between the hose engaging elements which are proportioned to apply a load on the hose contained in the device to bias the hose away from the gap and into contact with the clamp at a location diametrically opposite the radial projections.

BRIEF DESCRIPTION OF THE DRAWINGS

The invention will be better understood with reference to the following description taken in combination with the drawings, in which.

BRIEF DESCRIPTION OF THE PREFERRED EMBODIMENT(S)

Figure 1:
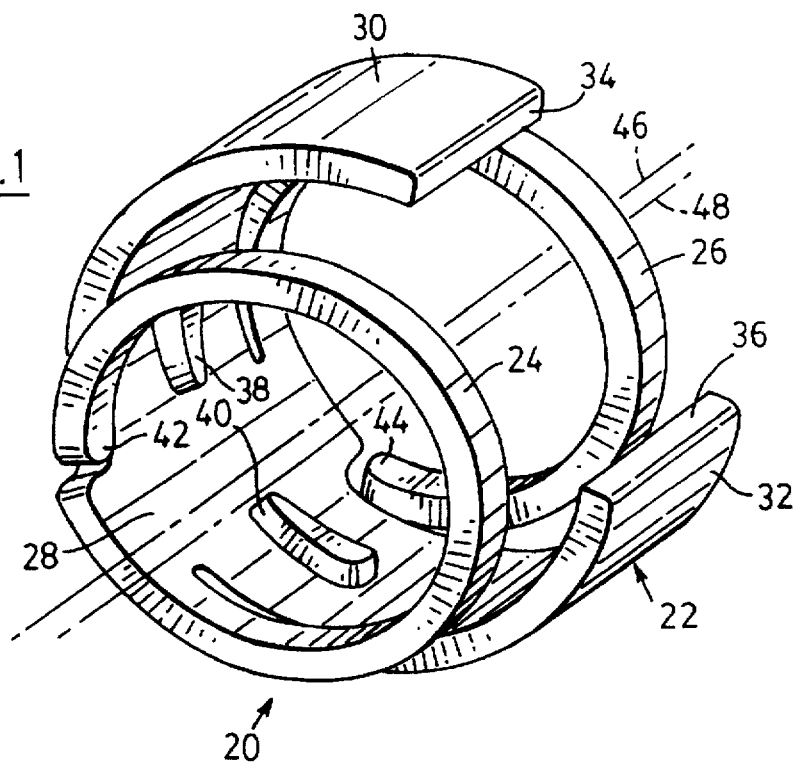
FIG. 1 is a perspective view of a hose clamp locating device according to a preferred embodiment of the invention.

Reference is first made to FIG. 1 which illustrates a hose locating device designated generally by the numeral 20 consisting essentially of a resilient C-shaped central clamp engaging element 22 bordered by a pair of resilient hose engaging elements 24, 26 which are cantilevered by attachment to a central land 28 of the clamp engaging element 22. As will be explained, the element 22 is intended to locate on a clamp and hold it in place while the elements 24, 26 are designed to draw the hose into engagement with the clamp and retain the clamp orthogonally with respect to the hose.

The element 22 has a pair of clamp engaging arms 30, 32 which extend in opposite directions from the central land 28 and, together with the land, form a generally cylindrical element 22. The arms terminate at opposed free ends 34, 36 which define a gap. As will become apparent, the gap is chosen to have a dimension less than the internal diameter of the element 22 for engagement on a clamp.

Clamps usually are designed to include openings which are there to better distribute stress. In order to better locate the clamps, an internal surface of the element 22 defines a pair of pegs 38, 40 which of course could be shaped differently if the openings in the clamp required it.

The hose engaging elements 24, 26 are similar in shape but extend peripherally from the central land 28 in opposite directions. The elements 24, 26 are generally cylindrical and cantilevered from the element 28 to terminate in respective free ends 42, 44.

It will be seen from FIG. 1 that the clamp engaging element 22 is disposed about a central axis 46 whereas the hose engaging elements 24, 26 are disposed about an axis 48 which is parallel to the first axis and spaced from that axis in a direction diametrically away from the gap between the free ends 34, 36 and towards the central land 28.

Figure 2:
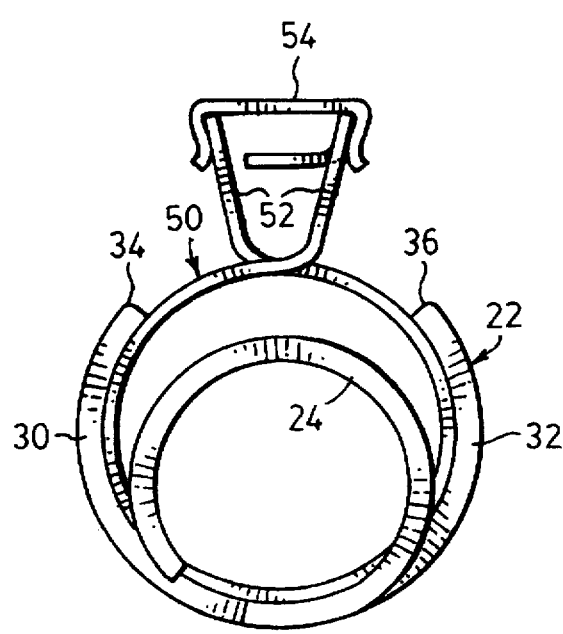
FIG. 2 is an end view of the device shown assembled with an exemplary hose clamp (drawn to a smaller scale than that used in FIG. 1)

In use, an exemplary clamp 50 seen in FIG. 2 is simply pushed through the gap between free ends 34, 36 and positioned so that conventional openings in the clamp (not shown) engage about the respective pegs 38, 40 (FIG. 1). Upstanding radial projections 52 on the clamp are then centered in the gap. These projections are exemplary of any such arrangements commonly used in clamps of this kind. In this case the elements are maintained in an open position by a clamp 54.

Figure 3:
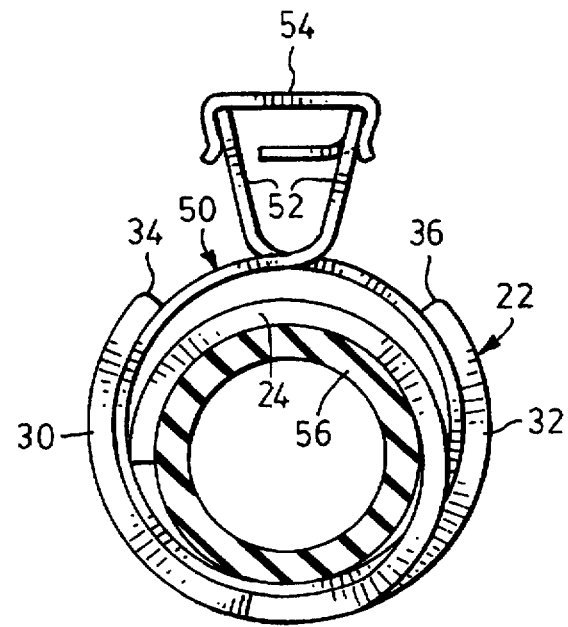
FIG. 3 is a view similar to FIG. 2 after the device and hose clamp have been positioned on a hose and prior to release of the clamp to engage the hose.

The clamp 50 is gripped between the resilient arms 30, 32 which were deflected as the clamp became trapped in the clamp engaging element 22. The assembly shown in FIG. 2 is now ready to receive a hose 56 into the position shown in FIG. 3. This is achieved by sliding the hose through the resilient hose engaging element 24, through the open clamp 50 and then through the other hose engaging element 26. Once in position, the hose comes under the influence of three forces. The hose engaging elements have been deflected in FIG. 3 and the energy stored in these elements causes downward forces (as drawn) to both sides of the hose engaging element 32. This creates a reactive load on the hose where it meets the clamp 50 and located hose engaging elements 24, 26. The axial spacing of these loads positions the clamp 50 orthogonally on the hose 56 so that when the clip 54 is released from the clamp, the clamp is free to make use of stored energy in the clamp to close around the hose to lock the hose on a rigid cylindrical fitting (not shown) as is conventional in many applications and particularly in automobile assemblies.

In the event that the hose must be removed, the locating device 20 is passive and permits removal as if the device were absent.

The device 20 can be of any suitable resilient material and is typically of Nylon (registered trademark) or glass-filled Nylon.

The embodiment described with reference to the drawings can be varied in accordance with principles of operation of the structure. For instance, the shape of the device can be changed provided that the clamp is held in the device and loads are applied to the hose to push the hose away from the gap and into contact with the clamp. These loads must be balanced to either side of the clamp in order to hold the clamp orthogonally with respect to the hose.

Generally the clamp engaging element must be made to match the size of the clamp which in turn is selected to be applied to a selected hose. The gap between the free ends 34, 36 (FIG. 1) should be less than the transverse dimensions of the open clamp in order that the arms 30, 32 deflect as the clamp is engaged in the device. Similarly, the hose energy elements 24, 26 are proportioned to be deflected by the hose sufficient to store enough energy in these elements to create the loading needed to hold the assembly on the hose in an orthogonal arrangement.

Also, the prestressed clamp has been used as exemplary of clamps generally.

The device can be with any hose clamp having the general form of a cylindrical main portion with radial projections to activate the clamp.

Such variations are written within the scope of the invention as described and claimed.

We claim:

1. A locating device for locating and holding a hose clamp on a cylindrical hose having a selected radius of curvature, the clamp being in an open condition and the device having:

a central land;

a pair of clamp engaging arms attached to the central land and extending away from one another and terminating at free ends;

the central land and arms being curved generally about a first axis and having a first radius greater than the radius of curvature of the hose, and the free ends defining a gap to provide clearance for radial extensions on said hose clamp; and a pair of generally cylindrical hose engaging elements attached to the central land with the clamp engaging arms between the elements, the elements extending about a second axis parallel to said first axis and spaced from said first axis towards the central land, the elements being resilient and terminating at free ends so that the elements are cantilevered from the central land, whereby upon creating an assembly of the device and a said hose clamp with the clamp contained between the hose engaging elements and within the clamp engaging arms, the assembly can be engaged over a said hose with the hose loose in the open clamp and the hose engaging elements deflected radially outwards thereby creating reactive loading to either side of the clamp to hold the assembly orthogonally with respect to the hose.

2. A locating device as claimed in claim 1 in which the central land and clamp engaging arms define an inner surface and in which the device further includes at least one inwardly projecting peg dependent from said inner surface for registration in an opening in the hose clamp to locate the hose clamp angularly inside the device.

3. A locating device as claimed in claim 1 in which the device is a one-piece structure of moulded plastics material.

4. A locating device for locating and holding a hose clamp on a cylindrical hose having a selected radius of curvature, the clamp being in an open condition and the device having:

a resilient C-shaped clamp engaging element having opposed free ends defining a gap, the element being generally cylindrical about a first axis and the gap being smaller than an internal diameter of the element so that a clamp can be pushed through the gap and gripped by the element; and a pair of resilient generally cylindrical hose engaging elements attached to the clamp engaging element and axially spaced with the damp engaging element between the hose engaging elements, the hose engaging elements having a common second axis spaced from said first axis away from said gap and free ends, the internal diameter of the hose engaging elements being proportioned so that the hose engaging elements are deflected radially outwards on assembly on a hose to bias the locating device and clamp into engagement with the hose.

5. A device as claimed in claim 4 in which the device is a one-piece structure of moulded plastics material.

6. A device as claimed in claim 4 in which the clamp engaging element defines an inner surface and in which the device further include at least one inwardly projecting peg dependent from said inner surface for registration in an opening in the hose clamp to locate the hose clamp angularly inside the device.

7. A clamp assembly for placement on a hose prior to engagement to hold the hose in place, the clamp assembly having:
- a clamp in an open condition, the clamp having a generally cylindrical main portion and radial projections operable to release the prestressed clamp to engage a hose; and
- a locating device containing the clamp, the device having a resilient generally cylindrical C-shaped element extending about said main portion and in engagement with the main portion, the element being disposed about a first axis and having opposed free ends defining a gap and said radial projections extending through the gap for actuation to release the prestressed clamp, and a pair of resilient generally cylindrical hose engaging elements spaced axially with the clamp engaging element between the hose engaging elements, the hose engaging elements having a common second axis spaced from said first axis away from said gap and free ends, the internal diameter of the hose engaging elements being proportioned so that the hose engaging elements are deflected radially outwards on assembly on a hose to bias the locating device and clamp into engagement with the hose.

8. An assembly as claimed in claim 7 in which the device is a one-piece structure of moulded plastics material.

9. An assembly claimed in claim 7 in which the clamp engaging element defines an inner surface and in which the device further includes at least one inwardly projecting peg dependent from said inner surface for registration in an opening in the hose clamp to locate the hose clamp angularly inside the device.

10. A locating device for locating and holding a hose clamp on a cylindrical hose having a selected radius of curvature, the clamp having radial projections and being in an open condition, and the device having:
- a resilient C-shaped clamp engaging element having opposed free ends defining a gap, the element being generally cylindrical about a first axis and the gap being smaller than an internal diameter of the element so that the clamp can be pushed through the gap and gripped by the element with said radial projections extending through the gap; and
- a pair of resilient hose engaging elements attached to the clamp engaging element and axially spaced with the clamp engaging element between the hose engaging elements, the hose engaging elements being proportioned to apply a load on said hose contained in the device to bias the hose away from said gap and into contact with the clamp at a location diametrically opposite the radial projections.

11. A device as claimed in claim 10 in which the device is a one-piece structure of moulded plastics material.

12. A device as claimed in claim 10 in which the clamp engaging element defines an inner surface and in which the device further includes at least one inwardly projecting peg dependent from said inner surface for registration in an opening in the hose clamp to locate the hose clamp angularly inside the device.

13. A clamp assembly for placement on a hose prior to engagement to hold the hose in place, the clamp assembly having:
- a clamp in an open condition, the clamp having a generally cylindrical main portion and radial projections operable to release the prestressed clamp to engage a hose; and
- a locating device containing the clamp, the device having a resilient generally cylindrical C-shaped element extending about said main portion and in engagement with the main portion, the element being disposed about a first axis and having opposed free ends defining a gap and said radial projections extending through the gap for actuation to release the prestressed clamp, and a pair of resilient generally cylindrical hose engaging elements spaced axially with the clamp engaging element between the hose engaging elements, the hose engaging elements being proportioned to apply a load on said hose contained in the device to bias the hose away from said gap and into contact with the clamp at a location diametrically opposite the radial projections whereby the assembly is located on the hose orthogonally with respect to the hose.

14. An assembly as claimed in claim 13 in which the device is a one-piece structure of moulded plastics material.

* * * * *